United States Patent
Tempel et al.

(10) Patent No.: US 10,725,305 B2
(45) Date of Patent: Jul. 28, 2020

(54) LENS MOVEMENT ASSEMBLIES FOR USE WITH HEAD MOUNTED DISPLAYS

(71) Applicant: FACEBOOK TECHNOLOGIES, LLC, Menlo Park, CA (US)

(72) Inventors: Mark Alan Tempel, Sammamish, WA (US); Jared I. Drinkwater, Auburn, WA (US); Robin Michael Miller, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 937 days.

(21) Appl. No.: 14/877,848

(22) Filed: Oct. 7, 2015

(65) Prior Publication Data

US 2017/0102546 A1 Apr. 13, 2017

(51) Int. Cl.
*G02B 27/22* (2018.01)
*G02B 27/01* (2006.01)
*G02B 7/12* (2006.01)

(52) U.S. Cl.
CPC ........... *G02B 27/0176* (2013.01); *G02B 7/12* (2013.01); *G02B 2027/0134* (2013.01); *G02B 2027/0159* (2013.01)

(58) Field of Classification Search
CPC ............ G02B 27/0176; G02B 27/0134; G02B 27/0159; G02B 27/01; G02B 27/017; G02B 27/0172; G02B 27/0127; G02B 27/2228; G02B 27/22; G02B 27/0132; G02B 27/0149; G02B 7/12; G02B 7/22; G02B 7/021; G02B 7/023; G02B 7/02; G02B 2027/0169; G02B 2027/0154; G02B 2027/0161; G02B 2027/01; G02B 25/00; G02B 23/00; G02B 23/18; A61F 9/02;
(Continued)

(56) References Cited

U.S. PATENT DOCUMENTS 5,486,841 A * 1/1996 Hara .................. G02B 7/12
345/8
5,880,773 A * 3/1999 Suzuki .................. G02B 7/12
345/8
(Continued)

FOREIGN PATENT DOCUMENTS

WO WO-2016085394 A1 * 6/2016 ......... G02B 27/0172

OTHER PUBLICATIONS

Non-Final Office Action dated Oct. 31, 2017 for U.S. Appl. No. 15/253,241 by Bristol, P., et al., filed Aug. 31, 2016.
(Continued)

*Primary Examiner* — Stephone B Allen
*Assistant Examiner* — Jyotsna V Dabbi
(74) *Attorney, Agent, or Firm* — FisherBroyles, LLP (57) ABSTRACT

Systems and methods for implementing head mounted displays may include lens movement assemblies. A head mounted display system includes a display housing surrounding one or more display devices, a first lens and a second lens. An input device on the display housing includes a control member moveable between a first position and a second position. A lens movement assembly is operatively coupled to the input device and the first and second lenses and is configured to move the first lens relative to the second lens in response to movement of the control member between the first position and the second position.

20 Claims, 11 Drawing Sheets

(58) Field of Classification Search
CPC ......... A61B 3/04; G06T 19/00; G06T 19/006;
G02C 3/00; G02C 3/003; G02C 3/02;
G02C 5/00; G02C 5/02; G02C 5/04–045
USPC ........ 359/473, 630, 480–482, 477, 407–418;
351/225, 233, 227; 2/426, 431
See application file for complete search history.

(56) References Cited

U.S. PATENT DOCUMENTS

| | | | |
|---|---|---|---|
| 6,254,240 | B1 | 7/2001 | Maciejewski et al. |
| 6,704,141 | B1* | 3/2004 | Nowak ................. G02B 7/002 |
| | | | 359/411 |
| 8,355,208 | B1* | 1/2013 | Baker ................ G02B 27/0176 |
| | | | 345/8 |
| 8,605,008 | B1 | 12/2013 | Prest et al. |
| 2005/0243418 | A1 | 11/2005 | La |
| 2006/0072206 | A1* | 4/2006 | Tsuyuki ............. G02B 27/0172 |
| | | | 359/631 |
| 2006/0179554 | A1 | 8/2006 | Barton et al. |
| 2011/0225709 | A1 | 9/2011 | Saylor et al. |
| 2012/0255104 | A1 | 10/2012 | Didier et al. |
| 2013/0083391 | A1* | 4/2013 | Teetzel ................... G02B 23/18 |
| | | | 359/409 |
| 2015/0103152 | A1 | 4/2015 | Qin |
| 2015/0138645 | A1* | 5/2015 | Yoo .................... G02B 27/0101 |
| | | | 359/630 |
| 2015/0238361 | A1 | 8/2015 | Orzeck et al. |
| 2016/0011422 | A1 | 1/2016 | Thurber et al. |
| 2016/0158064 | A1 | 6/2016 | Donnadieu et al. |
| 2017/0082859 | A1 | 3/2017 | Drinkwater |
| 2017/0192198 | A1 | 7/2017 | Bristol et al. |
| 2017/0318281 | A1 | 11/2017 | Edlund |

OTHER PUBLICATIONS

Non-Final Office action dated Sep. 21, 2017 for U.S. Appl. No. 14/964,199 by Drinkwater, J., et al., filed Dec. 9, 2015.
U.S. Appl. No. 15/253,241 by Bristol, P., et al., filed Aug. 31, 2016.
U.S. Appl. No. 14/964,199 by Drinkwater, J., et al., filed Dec. 9, 2015.

* cited by examiner

Fig. 5B ized or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments.

LENS MOVEMENT ASSEMBLIES FOR USE WITH HEAD MOUNTED DISPLAYS

TECHNICAL FIELD

This patent application is generally directed to head mounted displays and, more specifically, to head mounted displays having one or more lenses.

BACKGROUND

Human eyes are separated by an interpupillary distance. The distance between the left eye and the right eye can cause each eye to have a slightly different view. The human brain can combine the different views from the left and right eye to form a three-dimensional image. Disparities between the left eye view and the right eye view can provide depth cues that can be used by the brain to perceive depth in the three-dimensional image.

A typical head mounted display includes a flat display panel and lens for each eye. Separate images having slightly different views are presented to each display panel. A user wearing the head mounted display can view the display panels through each lens and the user's brain can combine the separate images to form a three dimensional image. If the distance between the lenses, however, is not substantially similar to the user's interpupillary distance, the user may not perceive depth in the image and/or may perceive two separate images, which can lead to inaccurate or uncomfortable viewing.

BRIEF DESCRIPTION OF THE DRAWINGS

Embodiments of the head mounted displays introduced herein may be better understood by referring to the following Detailed Description in conjunction with the accompanying drawings, in which like reference numerals indicate identical or functionally similar elements.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments.

DETAILED DESCRIPTION

Overview

Head mounted displays having lens movement assemblies are disclosed herein. In one embodiment, a head mounted display system includes a display housing surrounding one or more display devices, a first lens and a second lens. An input device on the display housing includes a control member moveable from a first position toward at least a second position. A lens movement assembly is operatively coupled to the input device and the first and second lenses, and is configured to move the first lens relative to the second lens in response to movement of the control member from the first position toward the second position. Accordingly, a user can move the control member from the first position toward the second position until the first lens and the second lens are a desired distance apart (e.g., a distance substantially similar to an interpupillary distance between the user's eyes). In some embodiments, the control member moves from the first position toward the second position in a direction generally parallel to a direction of the movement of the first lens relative to the second lens.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 1:
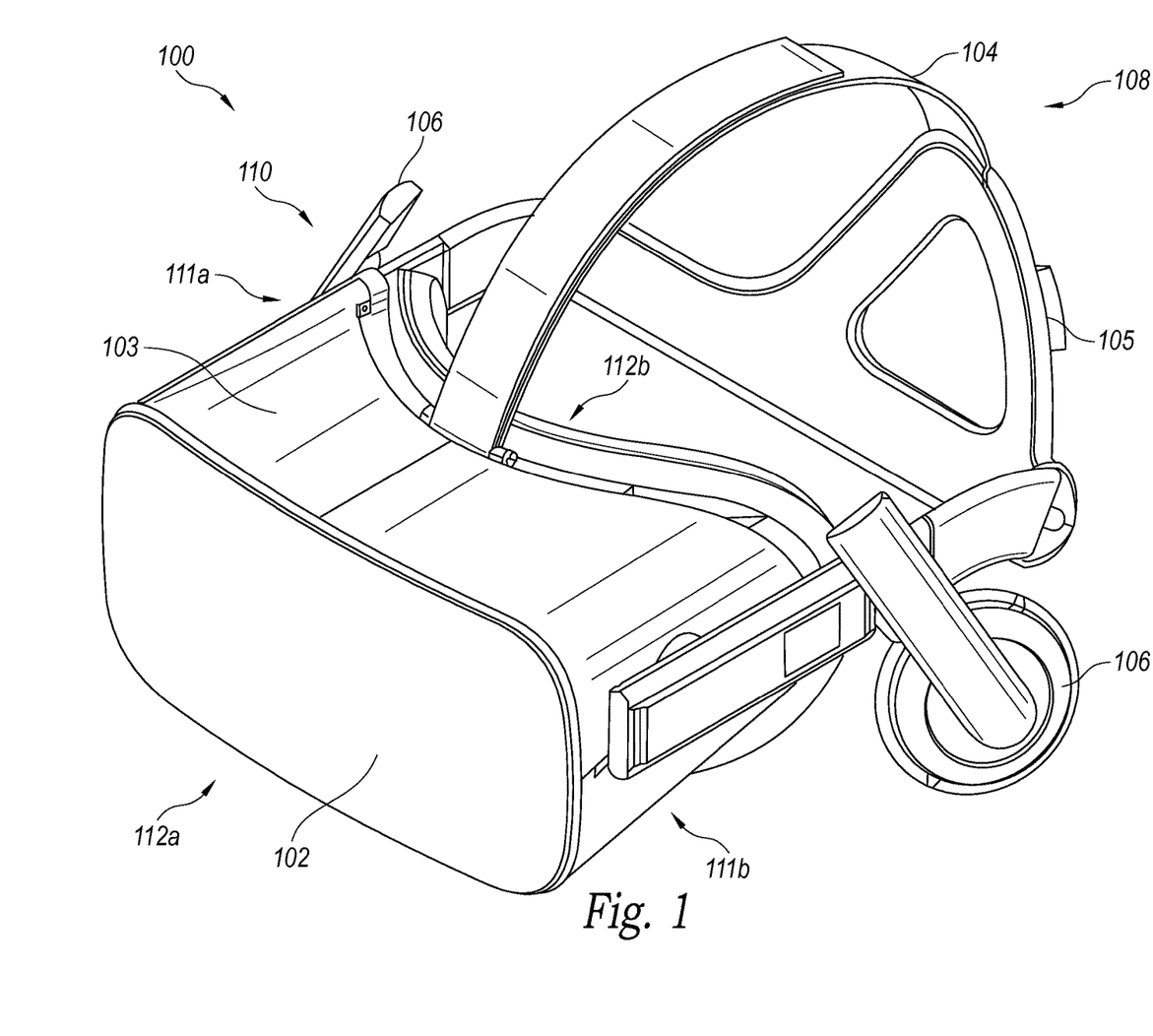
FIG. 1 is an isometric front view of a head mounted display system in accordance with an embodiment of the present technology.

FIG. 1 illustrates a head mounted display system 100 in accordance with an embodiment of the present disclosure. The head mounted display system 100 includes a pair of earphone assemblies 106, a strap assembly 108 and an enclosure or a display housing 110. The strap assembly 108 includes an adjustable strap 104 extending from the display housing 110 to a support portion 105 configured to be worn on a user's head and to support the head mounted display system 100 thereon. The display housing 110 includes a front cover and an exterior surface 103. The display housing 110 extends between a first end portion 111a (e.g., a right side portion) and a second end portion 111b (e.g., a left side portion). The display housing 110 further extends between distal and proximal end portions 112a and 112b, respectively. When a user is wearing the head mounted display system 100, the distal end portion 112a corresponds to a front portion of the display housing located farthest from a user's face, and the proximal end portion 112b corresponds to a rear portion of the display housing located closer or adjacent to the user's face.

In operation, the user places the support portion 105 on the back of his or her head and adjusts the strap 104 in order to position the proximal end portion 112b of the display housing 110 snugly against the user's face generally around and in front of the user's eyes. As explained in further detail below, the display housing 110 contains one or more optical assemblies having two optical lenses coupled to one or more corresponding displays. Embodiments of the present disclosure include a display housing having a lens movement assembly configured to move at least one of the lenses in the display housing relative to the other lens. An input device (e.g., one or more sliders, knobs, dials, switches) coupled to the lens movement assembly allows the user to move the lenses until center portions of the lenses are a desired distance apart. The desired distance may substantially correspond to an interpupillary distance between the user's eyes. In at least one embodiment the distance is in the range of about 50 mm to about 80 mm, inclusive.

Figure 2A:
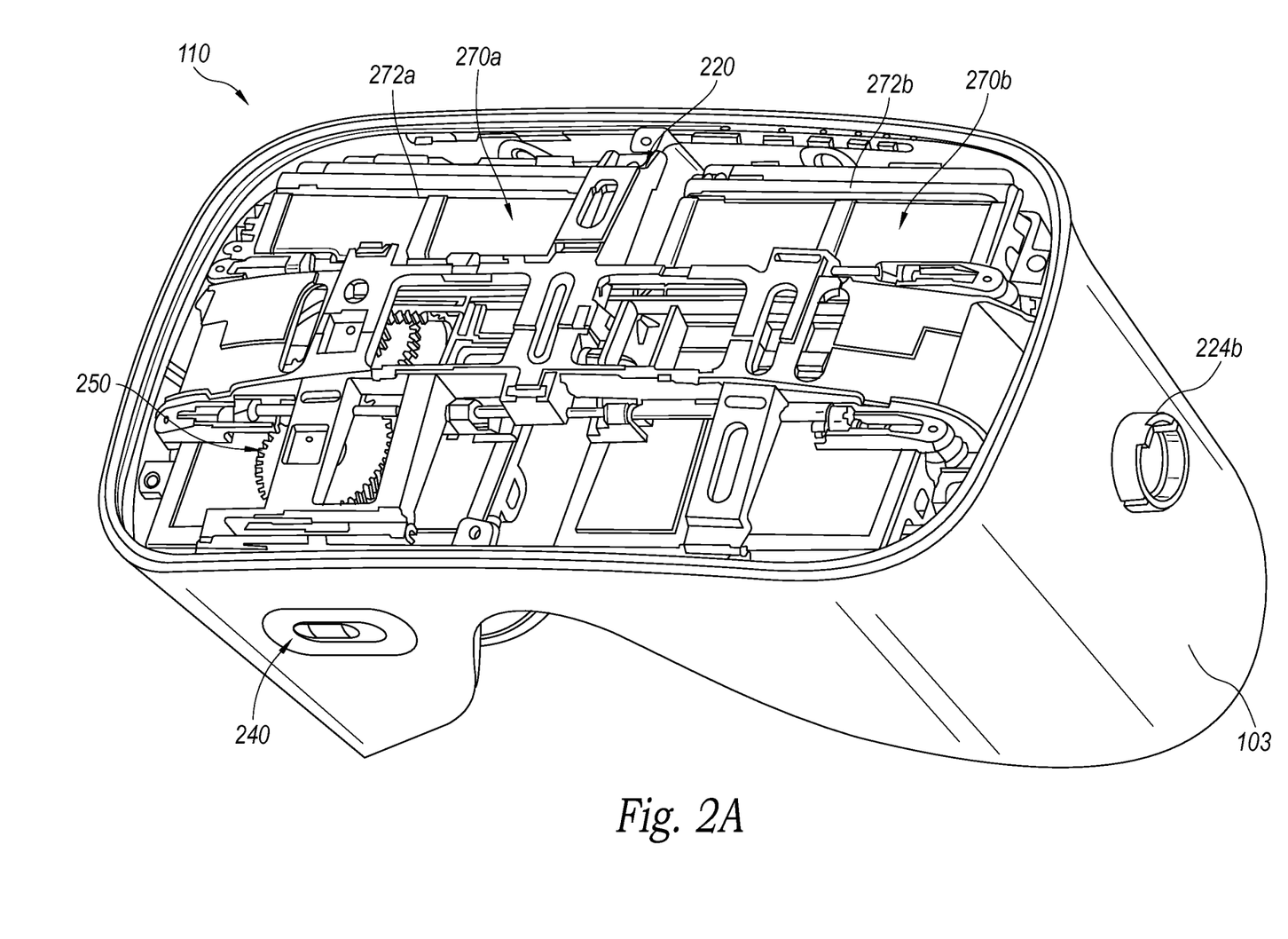
FIG. 2A is an isometric underside view of the display housing of FIG. 1 shown without a front cover.
Figure 2B:
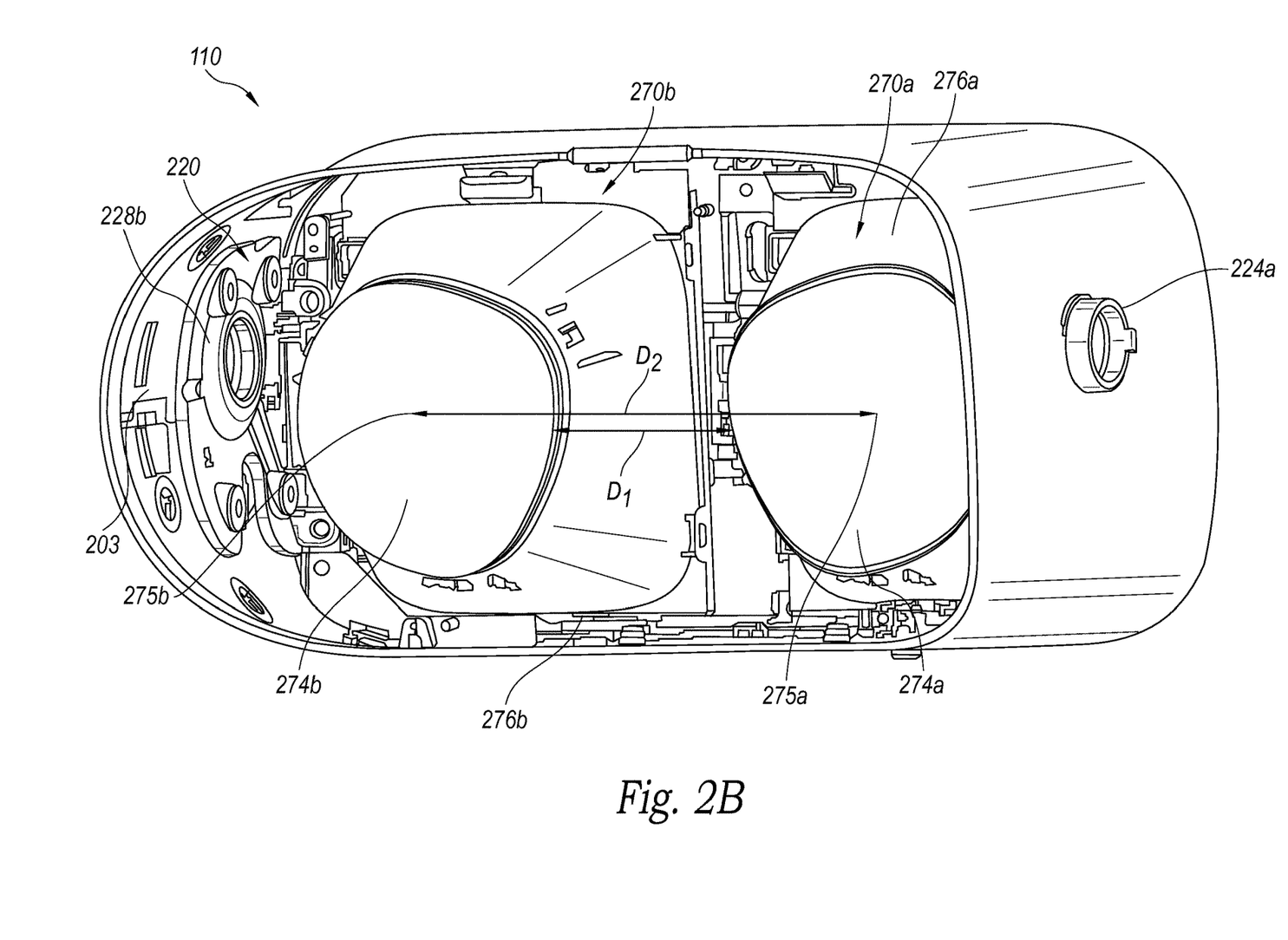
FIG. 2B is a left rear view of the display housing of FIG. 2A.
Figure 2C:
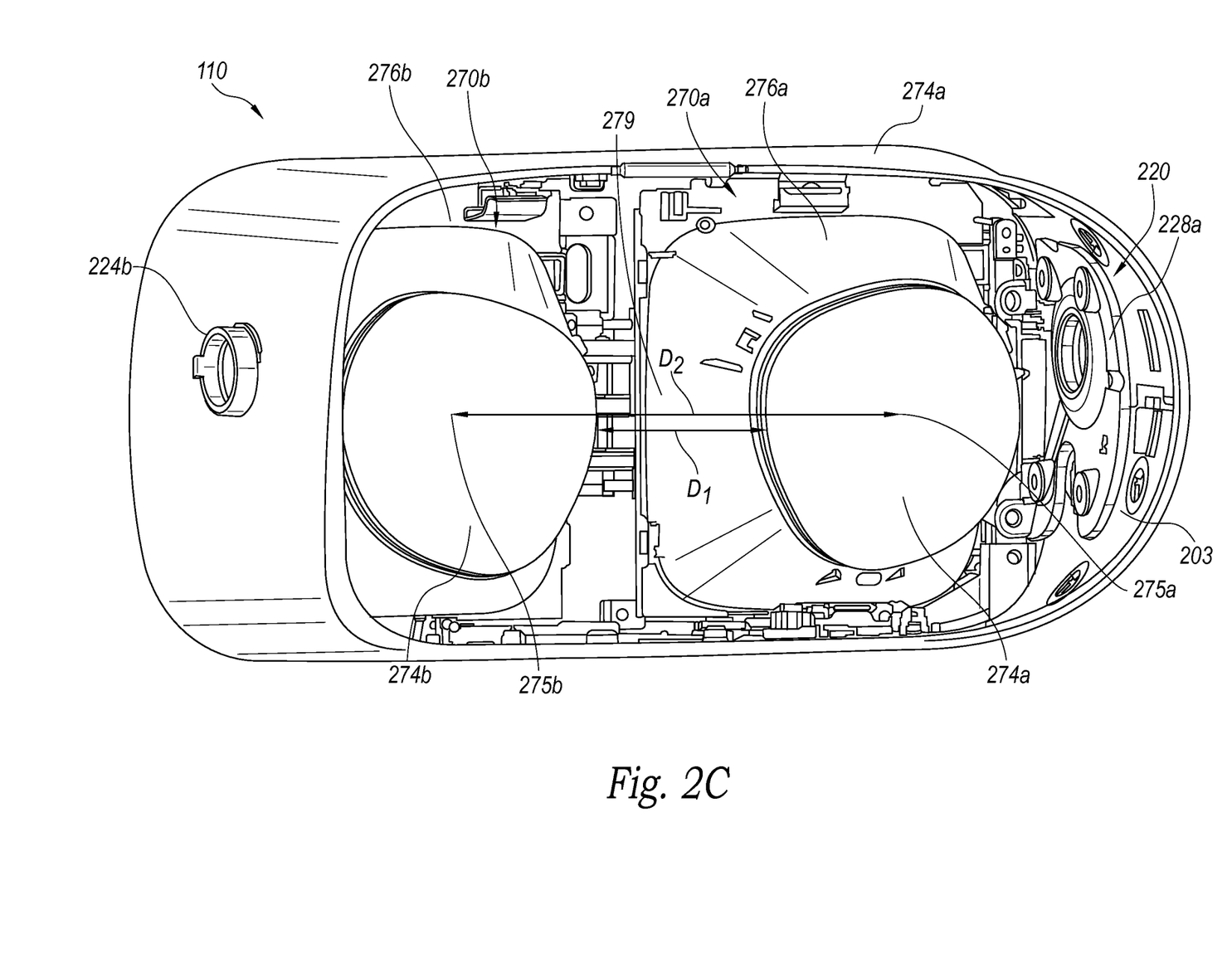
FIG. 2C is a right rear view of the display housing of FIG. 2A.

FIG. 2A is an isometric underside view of the display housing 110 shown without the front cover 102 (FIG. 1) for purposes of illustration. FIGS. 2B and 2C are corresponding left and right rear views of the display housing 110 of FIG. 2A. The display housing 110 contains a pair of spaced apart optical assemblies 270 (referred to individually as a first optical assembly 270a and a second optical assembly 270b) coupled to a lens movement assembly 250 (FIG. 2A) configured to move at least a portion of the individual optical assemblies 270 relative to the display housing 110 in response to user input received at an input device 240 to adjust the position of one or both of the optical assemblies relative to a user's eyes. A support structure 220 attaches the optical assemblies 270 to the display housing 110. In the illustrated embodiment, the support structure 220 is connected to the display housing by a first support member 224a (FIG. 2B) and a second support member 224b (FIG. 2A) extending through corresponding apertures in the first and second end portions 111a and 111b, respectively of the display housing 110. In some embodiments, the first support member 224a and the second support member 224b can be configured, for example, to receive corresponding portions of the earphone assemblies 106 (FIG. 1). In the illustrated embodiment, the support structure 220 includes a first bracket 228a (FIG. 2C) and a second bracket 228b (FIG. 2B) that attach the support structure 220 to an interior surface 203 of the display housing 110, so as to support the optical assemblies 270 within the display housing 110.

The optical assemblies 270 include one or more corresponding displays 272 (referred to individually as a first display panel 272a and a second display panel 272b) coupled to corresponding spaced apart lenses 274 (referred to individually as a first lens 274a and a second lens 274b) by hollow lens cups 276 (referred to individually as a first lens cup 276a and a second lens cup 276b). The lens cups 276 are truncated, generally conical, opaque vision shields positioned between the lenses 274 and the corresponding displays 272 that hold the lenses 274 apart from the corresponding displays 272a by a predetermined distance in an axial direction extending between the distal and proximal end portions 112a and 112b. In the illustrated embodiment, the axial distance between the lenses 274 and the corresponding displays 272 is in the range of about 20 mm to about 50 mm, inclusive.

The first and second optical assemblies 270a and 270b are also laterally spaced apart from each other in a direction generally parallel to a longitudinal axis of the display housing 110, such that the inner most edges of the first and second lenses 274a and 274b are spaced apart by a first distance $D_1$. In the illustrated embodiment, the first distance $D_1$ is in the range of about 10 mm to 30 mm, inclusive. The lenses 274 are shaped and sized so that center portions 275 (referred to individually as a first center portion 275a and a second center portion 275b) of the lenses 274 are laterally spaced apart by an interaxial distance or a second distance $D_2$, which can be in the range of about 40 mm to 100 mm inclusive. In one or more embodiments, the distance $D_2$ is between about 50 mm and 80 mm, or between about 60 mm and 70 mm, or between about 62 mm and 65 mm, inclusive.

As explained in more detail below in reference to FIGS. 2D-5B, in some embodiments, a user can manipulate the input device 240 to move one or both of the optical assemblies 270 to laterally adjust the position of the first lens 274a and/or second lens 274b to provide a selected the second distance D_sub_2 between the lenses 274. In some embodiments, adjustment of the input device 240 causes the first lens 274a and the second lens 274b to simultaneously move relative to the display housing while a midpoint 279 (FIG. 2C) therebetween remains constant and/or substantially stationary relative to the display housing 110. In certain embodiments, the input device 240 can be adjusted to move the lenses 274 so that the second distance D_sub_2 substantially corresponds to the user's interpupillary distance (IPD)—a distance between the centers of each of the user's pupils. An average adult male, for example, has an IPD of approximately 63.5 mm. Interpupillary distances of adult humans can range, however, between about 50 mm and about 80 mm. As those of ordinary skill in the art will appreciate, a disparity of the IAD between lenses and the user's IPD may inhibit and/or prevent perception of a three-dimensional (3D) image and/or field of view. Embodiments of the present technology are expected to reduce user discomfort and eyestrain and enhance 3D image perception by allowing the user to adjust an IAD between the lenses to a distance substantially similar to her IPD. Adjustment of the IAD between lenses to a distance similar to the user's IPD or another desired distance can provide more comfortable and accurate viewing, thereby allowing the user to interact with a virtual reality and/or augmented reality system coupled to the displays 272. User adjustment of the IAD to match the user's IPD or another distance can also provide for enhanced 3D image perception.

Figure 2D:
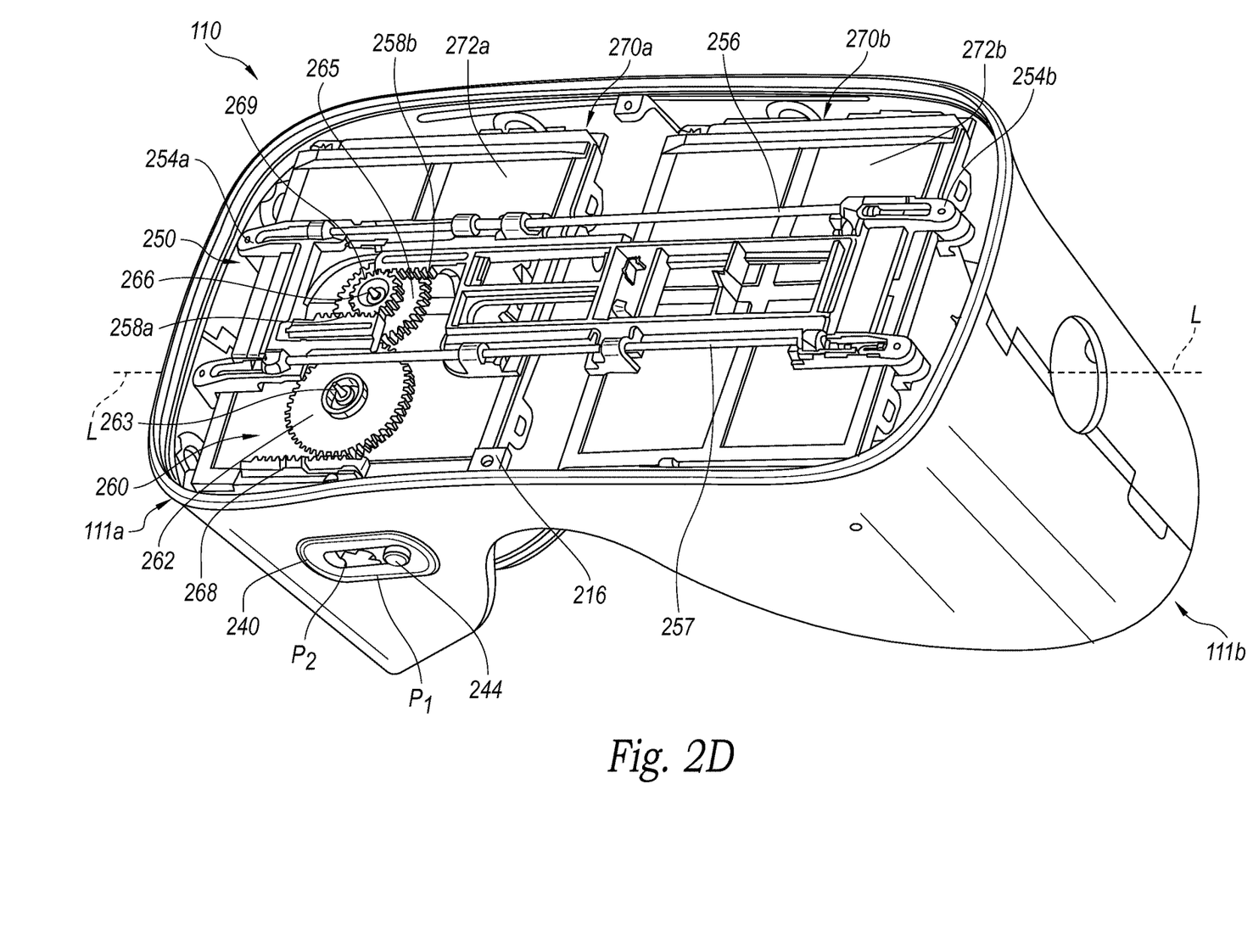
FIG. 2D is an isometric underside view of the display housing of FIG. 2A shown without a support structure to avoid obscuring features in the display housing.
Figure 3A:
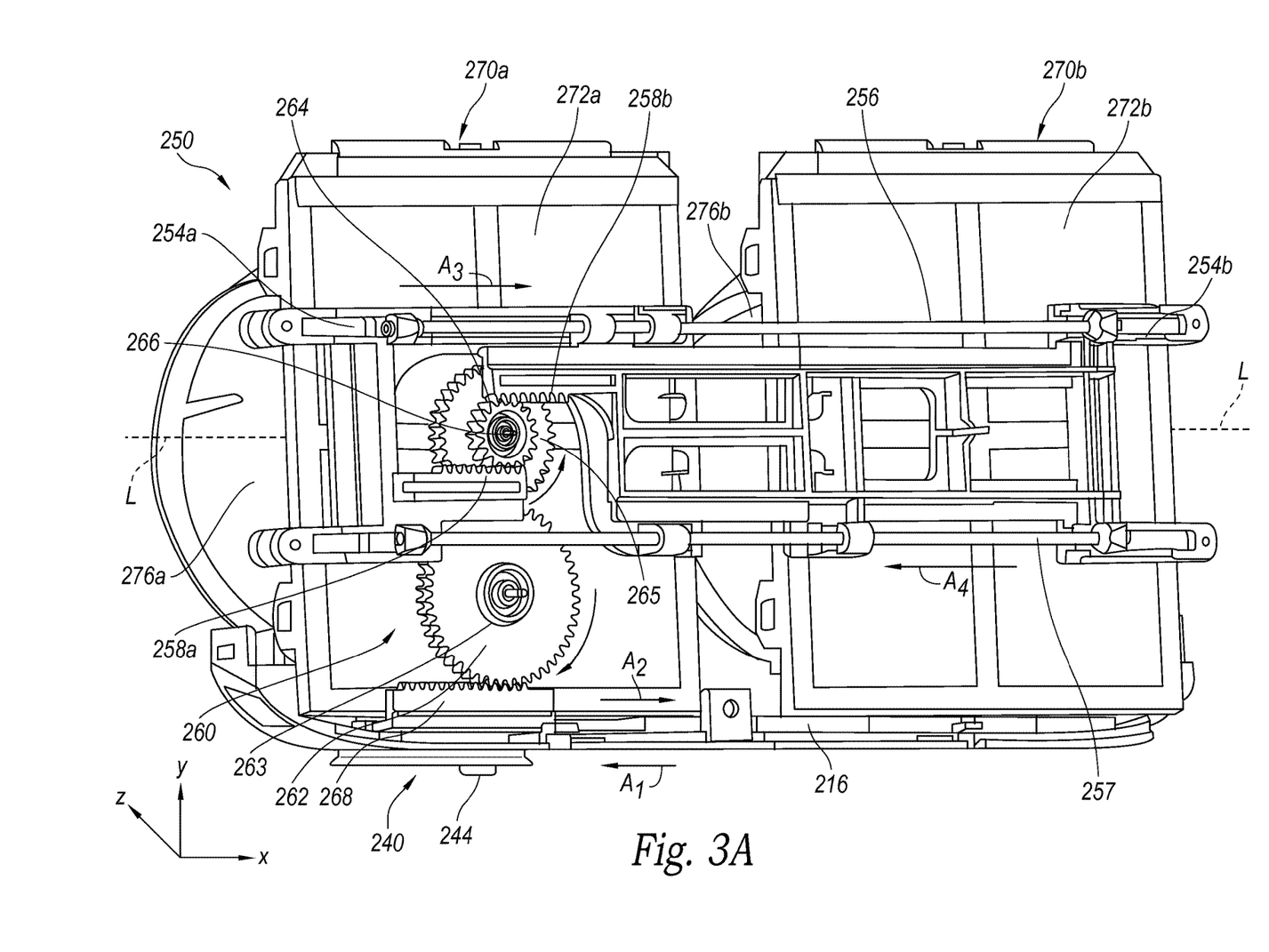
FIG. 3A is an isometric front view of a lens movement assembly, an input device and the optical assemblies of FIG. 2D.
Figure 3B:
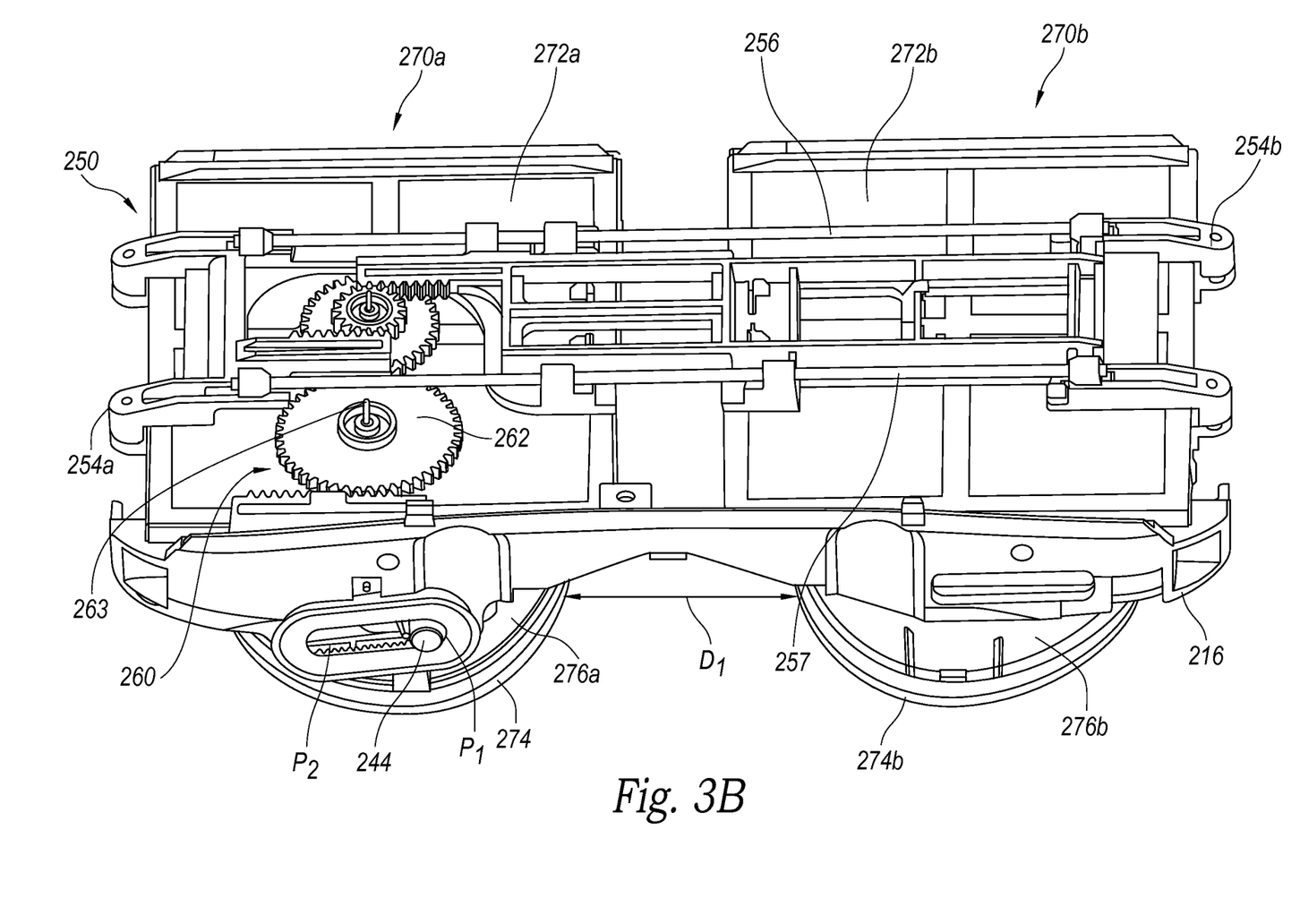
FIG. 3B is an isometric underside view of the lens movement assembly, the input device and the optical assemblies of FIG. 2D.

FIG. 2D is a partial isometric underside view of the input device 240, the lens movement assembly 250, and the optical assemblies 270, which are shown with the display housing 110 but without the support structure 220 to avoid obscuring features within the display housing. FIGS. 3A and 3B are isometric front and underside views, respectively, of the input device 240, the lens movement assembly 250 and the optical assemblies 270, which are shown without the display housing 110. Referring to FIGS. 2D, 3A and 3B together, the lens movement assembly 250 includes a first frame 254a and a second frame 254b attached to the first optical assembly 270a and the second optical assembly 270b, respectively. The first frame 254a and the second frame 254b are slidably mounted to a first rail 256 and a second rail 257 and are configured to move laterally therealong. In some embodiments, the first frame 254a and the second frame 254b move along the first and second rails 256 and 257 in a direction substantially parallel to a longitudinal axis L of the display housing 110.

A gear assembly 260 operationally couples the first frame 254a and the second frame 254b to the input device 240. The input device 240 includes a control member 244 (e.g., an actuatable button, a slider, a knob, a dial) configured to be moveable by a user. In the illustrated embodiment, the control member 244 is laterally moveable between a first position $P_1$ and at least a second position $P_2$. As explained in further detail below, movement of control member 244 between the first position $P_1$ and the second position $P_2$ can cause corresponding rotation of one or more gears of the gear assembly 260, thereby moving the first frame 254a and/or the second frame 254b relative to each other, and thus moving the first lens 274a (FIGS. 2B and 2C) and/or the second lens 274b (FIGS. 2B and 2C) substantially laterally relative to each other to adjust the distance $D_2$ as desired by the user.

The gear assembly 260 of the illustrated embodiment includes a pinion 264 configured to simultaneously engage the gear teeth of a first rack 258a on the first frame 254a and the gear teeth of a second rack 258b on the second frame 254b and spaced apart from the first rack 258a. The pinion 264 is operationally coupled (e.g., fixedly attached) to a first gear 265, both of which rotate about a common pivot pin 266. A second gear 262 mates with the first gear 265 and rotates about a separate pivot pin 263. The second gear 262 also mates with the gear teeth of a rack 268 slidably attached to a lower support portion 216 and operationally coupled to the input device 240. Accordingly, the first and second gears 265 and 262 interconnect the rack 268 and input device 240 to the pinion 264 and the first and second racks 258a and 258b, such that lateral motion of the input device 240 and associated rack 268 causes opposing lateral motion of the first and second racks 258a and 258b and the associated frames 254 and optical assemblies 270. In the illustrated embodiment, the pinion 264 has a pinion diameter (e.g., between about 5 mm and about 15 mm) smaller than a first diameter (e.g., between about 15 mm and about 30 mm) of the first gear 265, and smaller than the second diameter of the second gear (e.g., between about 20 mm and about 40 mm). In some embodiments, however, the pinion diameter, first gear diameter and second gear diameter can have any suitable dimension. In certain embodiments, for example, the second gear diameter is less than the first gear diameter.

Referring now to FIGS. 3A and 3B, in operation the user moves the control member 244 laterally to correspondingly move via the gearing the first lens 274a (FIG. 3B) relative to the second lens 274b (FIG. 3B) and/or the second lens 274b relative to the first lens 274a. The user may, for example, move the control member 244 to a position within the input device 240 such that the second distance $D\_sub\_2$ (FIG. 2B) between the first lens 274a and the second lens 274b substantially corresponds to the user's IPD. For example, the user can move the control member 244 laterally from the first position $P\_sub\_1$ toward the second position $P\_sub\_2$ in a first direction $A\_sub\_1$ relative to the longitudinal axis L (e.g., substantially toward the first end portion 111a). As discussed in greater detail below, the control member 244 is coupled to the rack 268 via additional gearing so that the rack 268 correspondingly moves in a second direction $A\_sub\_2$ relative to the longitudinal axis L (e.g., substantially toward the second end portion 111b opposite the first direction $A\_sub\_1$), thereby causing the second gear 262 to rotate clockwise about the pivot pin 263. From the perspective shown in FIG. 3B, the first gear 265 and the pinion 264 together rotate counterclockwise about the pivot pin 266 in response to clockwise rotation of the second gear 262. Accordingly, the first frame 254a moves in a third direction $A\_sub\_3$ relative to the longitudinal axis toward the second frame 254b, and the second frame 254b moves in a fourth, opposite direction $A\_sub\_4$ toward first frame 254a, thereby uniformly moving the first and second optical assemblies 270a and 270b as separate units toward each other to reduce the distance $D\_sub\_1$ between the first lens 274a and the second lens 274b (FIG. 3B). As those of ordinary skill in the art will appreciate, movement of the control member 244 toward the first position $P\_sub\_1$ from another position within the input device 240 can correspondingly move the first and second optical assemblies 270a and 270b away from each other to increase the distance $D\_sub\_1$ between the lenses 274, thereby allowing the user to adjust the lateral position of the optical assemblies to best correspond to the user's IPD and/or the user's preference.

In some embodiments, the first direction $A_1$ and fourth direction $A_4$ are substantially the same, and similarly the second direction $A_2$ and the third direction $A_3$ are substantially the same. In some embodiments, the first direction $A_1$, the second direction $A_2$, the third direction $A_3$ and the fourth direction $A_4$ are substantially parallel to the longitudinal axis L. In other embodiments, however, the first direction $A_1$, the second direction $A_2$, the third direction $A_3$ and the fourth direction $A_4$ can have any suitable orientation relative to the longitudinal axis L. Moreover, in the illustrated embodiment, the first frame 254a moves the first display 272a and associated first lens 274a as a unit, and the second frame 254b moves the second display 272b and associated second lens 274b as a unit in response to user input received at the input device 240.

Figure 4A:
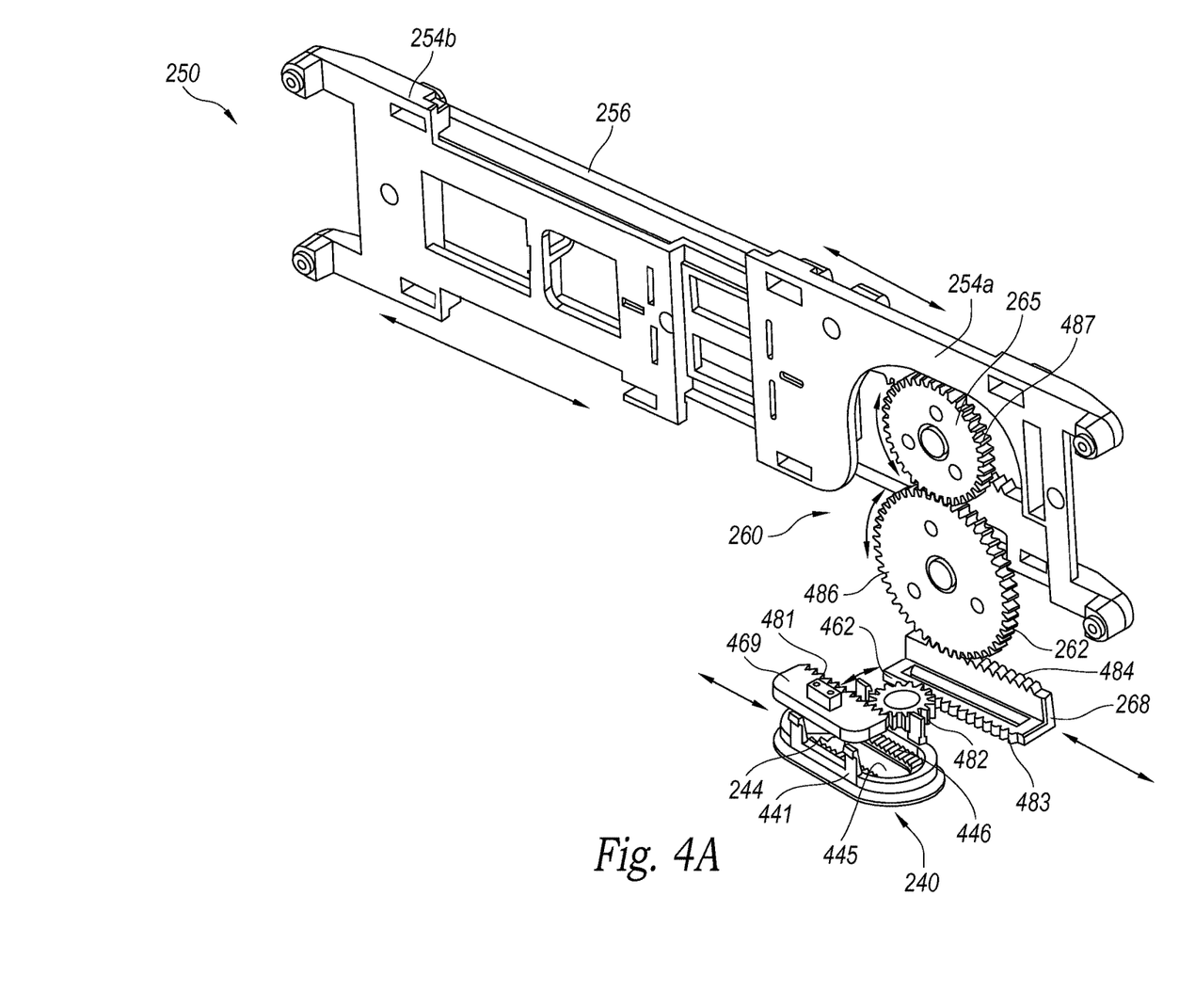
FIG. 4A is an isometric rear view of the lens movement assembly and the input device of FIG. 2D.
Figure 4B:
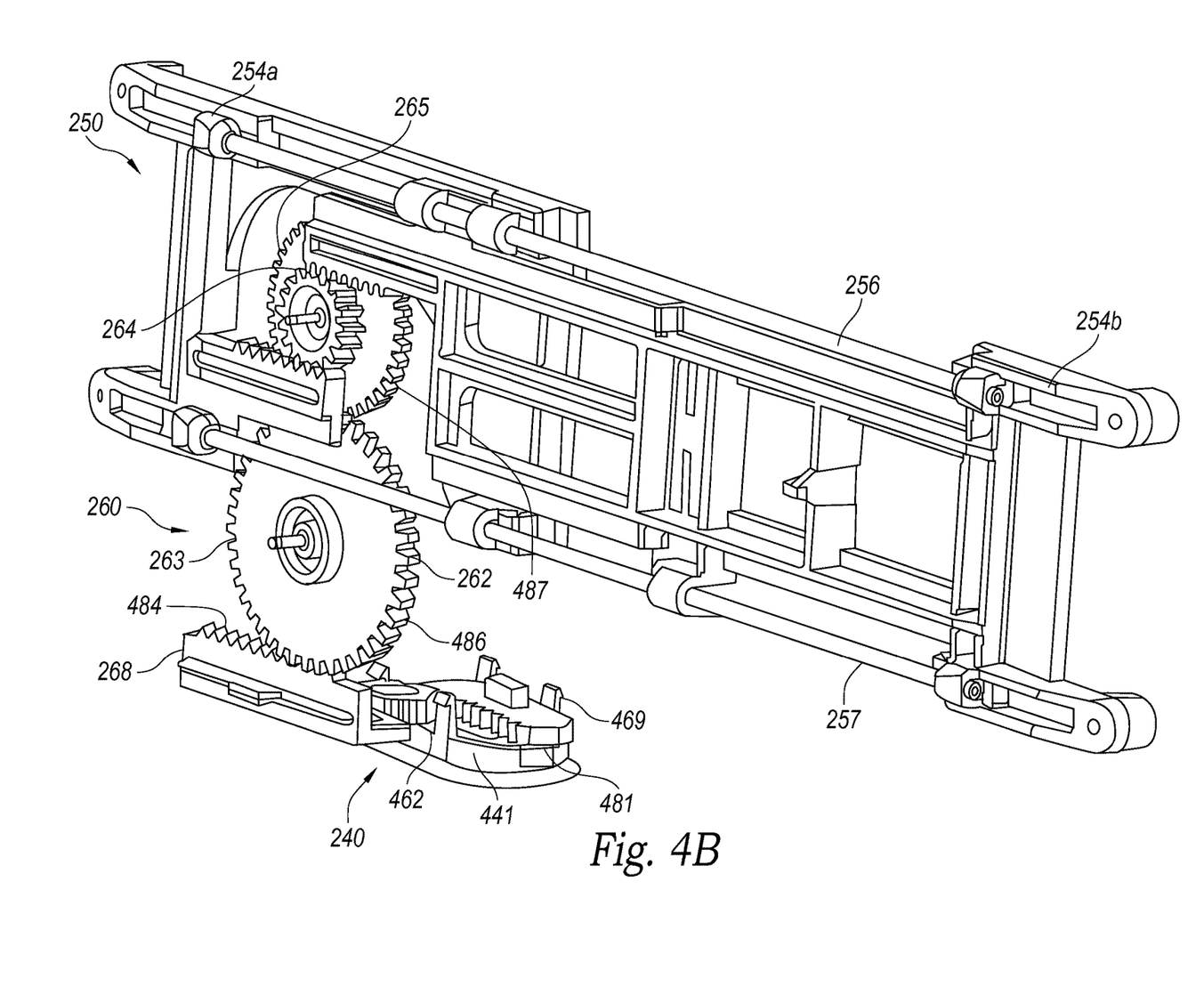
FIG. 4B is an isometric front view of the lens movement assembly and the input device of FIG. 2D.

FIGS. 4A and 4B are partial isometric rear and front views, respectively, of the input device 240 and the lens movement assembly 250. As seen in FIGS. 4A and 4B, the rack 268 has an L-shaped cross-section and has gear teeth on each of the perpendicularly oriented legs of the rack. The rack 268 is positioned so the teeth 487 of the first gear 265 mate with the teeth 486 of the second gear 262, which mate with the gear teeth on the vertical leg 484 of the rack 286. The gear teeth on the horizontal leg 483 of the rack 286 mate with the gear teeth 482 of a horizontally-oriented pinion 462, which mates with the gear teeth 481 of a control rack 469 coupled to the control member 244. Accordingly, lateral movement of the control member 244 in the illustrated embodiment causes corresponding movement of the pinion 462, the rack 268, the second gear 262, the first gear 265 and the pinion 264 (FIG. 4B) thereby moving the first and second frame 254a and 254b and the associated first and second optical assemblies 270a and 270b relative to each other.

The control member 244 is configured to move along a groove, a channel or an opening 445 in a frame 441. A grooved surface 446 surrounds the opening 445. As described in further detail below in reference to FIGS. 5A and 5B, the control member 244 can comprise an actuatable button surrounded by a grooved surface configured to engage the grooved surface 446 surrounding the opening 445, thereby inhibiting movement of the control member 244 within the opening 445 unless the control member 244 is actuated inward relative to the display housing 110 (FIGS. 1 and 2A-2C).

Figure 5A:
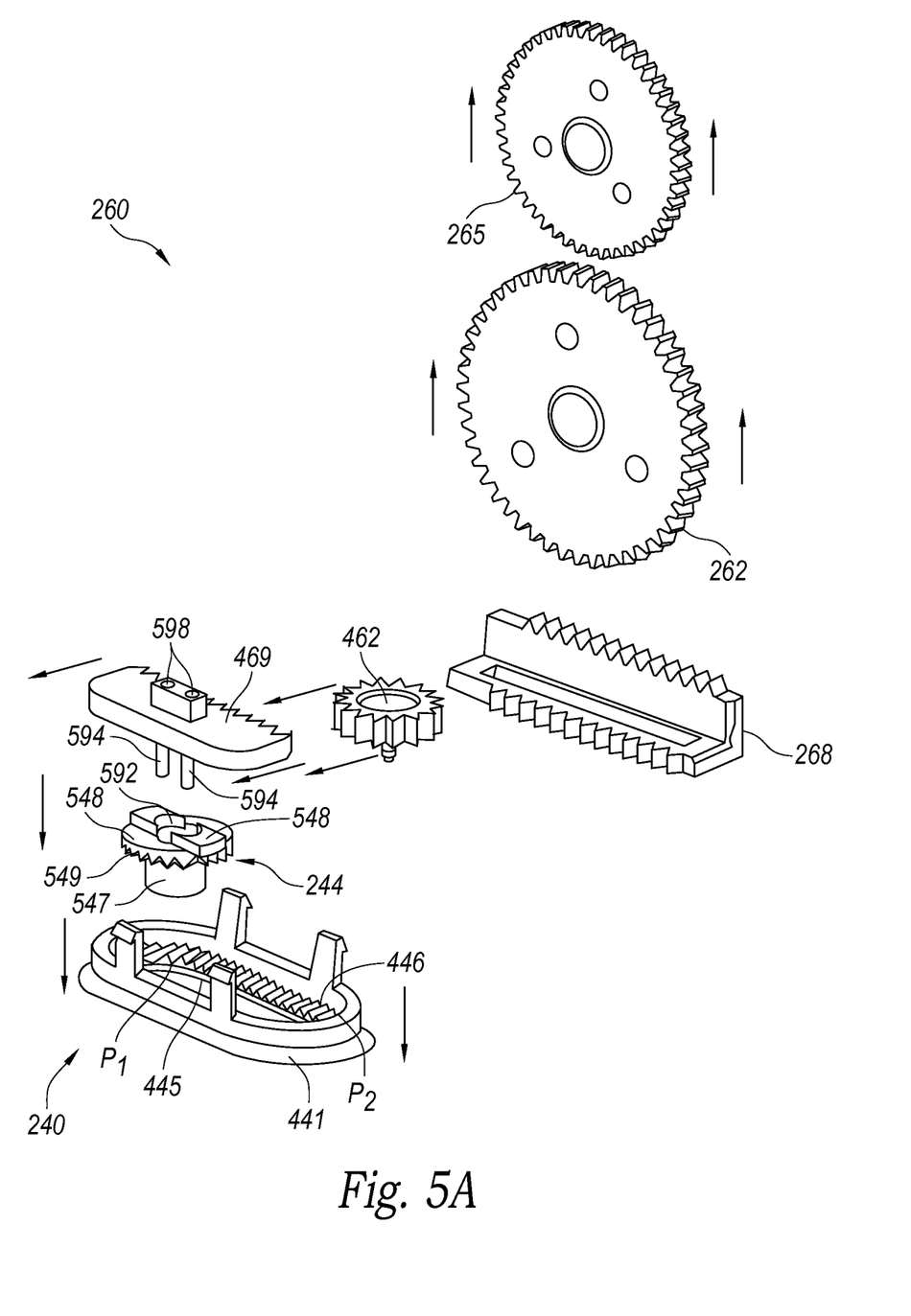
FIG. 5A is a partially exploded isometric view of the input device and a portion of the lens movement assembly of FIG. 2D.
Figure 5B:
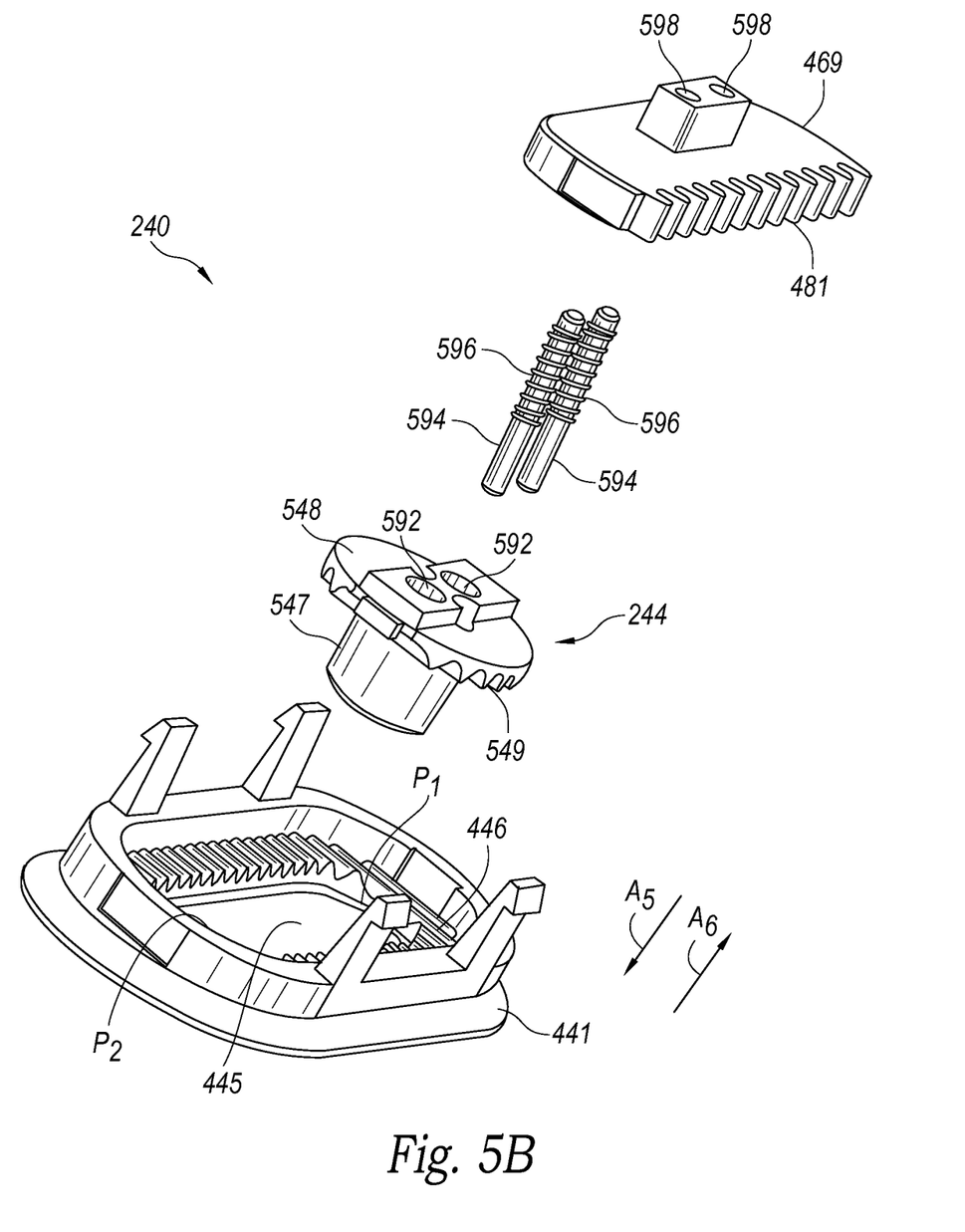
FIG. 5B is an exploded view of the input device of FIG. 2D.

FIG. 5A is a partially exploded isometric view of the input device 240 and a portion of the lens movement assembly 250. FIG. 5B is an exploded view of the input device 240. Referring to FIGS. 5A and 5B together, the control member 244 includes a lower portion 547 and an upper portion 548 having a grooved underside surface 549. A plurality of cylindrical bores 592 are configured to receive corresponding spring-loaded pins 594 having springs 596 (FIG. 5B). The spring-loaded pins 594 and the springs 596 are received into cylindrical cavities 598 of the control rack 469. In operation, the control member 244 is configured to operate in a first mode and at least a second mode (e.g., in a first orientation and at least a second orientation relative to the display housing 110 (FIG. 1)). In the first mode, the spring-loaded pins 594 exert a force in a direction $A_5$ (e.g., an outward direction relative to the display housing 110 (FIG. 1) generally perpendicular to the longitudinal axis L thereof), maintaining contact between the grooved underside surface 549 and the grooved surface 446, thereby inhibiting movement of the control member 244 within the opening 445. In the second mode, however, a user exerts a force in a direction $A_6$ (e.g., an inward direction relative to the display housing 110 (FIG. 1) generally perpendicular to the longitudinal axis L thereof), disengaging the grooved underside surface 549 from the grooved surface 446, thereby allowing movement of the control member 244 through the opening 445.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

We claim:

1. A head mounted display system including a display housing comprising:
    a first optical assembly;
    a second optical assembly;
    an input device comprising:
        a frame encompassing an opening surrounded by a first grooved surface; and
        a control member comprising a button surrounded by a second grooved surface configured to engage the first grooved surface, the control member configured to move laterally within the opening when actuation of the button disengages the second grooved surface of the control member from the first grooved surface of the opening; and
    a lens movement assembly operatively coupled to the first optical assembly, the second optical assembly, and the input device, wherein the lens movement assembly is configured to move the first optical assembly relative to the second optical assembly in response to actuation of the button allowing lateral movement of the control member to adjust a lateral distance between the first optical assembly and the second optical assembly within the display housing.

2. The system of claim 1, wherein:
    the first optical assembly includes a first lens cup coupling a first lens to a first display panel; and
    the second optical assembly includes a second lens cup coupling a second lens to a second display panel.

3. The system of claim 1, wherein:
    the display housing has a longitudinal axis; and
    the first optical assembly and the second optical assembly are laterally movable within the display housing in a direction substantially parallel to the longitudinal axis.

4. The system of claim 3, wherein the first optical assembly and the second optical assembly are simultaneously movable in opposite directions relative to the display housing.

5. The system of claim 3, wherein:
    the opening is an elongate opening whose length is substantially parallel to the longitudinal axis; and
    the control member operates in a first mode and a second mode, the control member when operating in the first mode is blocked from moving within the opening, and the control member when operating in the second mode is unblocked and is slidable relative to the opening.

6. The system of claim 5, wherein the control member is operating in the first mode when actuation of the button engages the second grooved surface of the control member with the first grooved surface of the opening.

7. The system of claim 1, wherein actuation of the button comprises movement of the button inward from a first orientation relative to the display housing toward a second orientation.

8. The system of claim 1, wherein the lens movement assembly comprises:
    a first frame coupled to the first optical assembly; and
    a second frame coupled to the second optical assembly, the first frame and the second frame configured to move in response to lateral movement of the control member.

9. The system of claim 8, wherein:
    the display housing has a longitudinal axis; and
    the first frame and the second frame are configured to move in opposite directions relative to the longitudinal axis.

10. The system of claim 8, wherein:
the control member is configured to move in a first direction; and
the first frame is configured to be moveable along at least a first rail in a second direction, the second direction being opposite to the first direction.

11. The system of claim 8, wherein:
the first frame comprises a first rack;
the second frame comprises a second rack spaced apart from the first rack; and
the lens movement assembly comprises a pinion configured to engage and move the first and second racks upon rotation of the pinion.

12. The system of claim 11, wherein:
the pinion is rotationally coupled to the control member via a plurality of gears;
the pinion is configured to rotate in response to lateral movement of the control member; and
the first frame is configured to move relative to the second frame in response to rotation of the pinion.

13. The system of claim 1, wherein:
the first optical assembly comprises a first lens;
the second optical assembly comprises a second lens;
lateral movement of the control member comprises movement of the control member from a first position to a second position;
the first lens and the second lens have corresponding first and second center portions;
the first and second center portions are separated by a first distance when the control member is at the first position; and
the first and second center portions are separated by a second distance less than the first distance when the control member is at the second position.

14. The system of claim 13 wherein the first distance is less than 80 mm and the second distance is greater than 50 mm.

15. A head mounted display; comprising:
a display enclosure;
an input device included in the display enclosure, the input device comprising:
a frame encompassing an opening surrounded by a first grooved surface; and
a control member including a button surrounded by a second grooved surface configured to engage the first grooved surface, the control member configured to move laterally within the opening when actuation of the button disengages the second grooved surface of the control member from the first grooved surface of the opening;
a first optical assembly and a second optical assembly each movably positioned within the display enclosure; and
a movement assembly operatively coupled to the input device, the first optical assembly, and the second optical assembly, wherein the movement assembly comprises:
a first frame coupled to the first optical assembly; and
a second frame coupled to the second optical assembly, the first frame and the second frame configured to move in response to actuation of the button allowing lateral movement of the control member causing movement of at least one of the first optical assembly and the second optical assembly relative to the display enclosure.

16. The head mounted display of claim 15, wherein the first frame and the second frame are configured to move substantially parallel to a longitudinal axis of the display enclosure.

17. The head mounted display of claim 15, wherein:
the movement assembly further comprises a pinion rotationally coupled to the control member;
the pinion is configured to engage spaced apart first rack and second rack attached to the first frame and the second frame, respectively; and
the first frame and the first optical assembly are configured to move relative to the second frame and the second optical assembly in response to rotation of the pinion.

18. A head mounted display assembly wearable on a head of a user and for use with a virtual reality system comprising a housing comprising:
a first optical assembly including a first lens;
a second optical assembly including a second lens;
a frame encompassing an opening surrounded by a first grooved surface; and
a control member at least partially disposed in the opening, the control member:
comprising a button surrounded by a second grooved surface configured to engage the first grooved surface;
configured to move laterally within the opening between a first position and a second position when actuation of the button disengages the first grooved surface from the second grooved surface; and
coupled to the first optical assembly and the second optical assembly, the first optical assembly configured to move within the housing relative to the second optical assembly in response to movement of the control member between the first position and the second position, the first lens and the second lens separated by a first interaxial distance when the control member is at the first position, and the first lens and the second lens separated by a second interaxial distance less than the first interaxial distance when the control member is at the second position.

19. The head mounted display assembly of claim 18, wherein the first interaxial distance and the second interaxial distance have a substantially same midpoint location relative to the housing.

20. The head mounted display assembly of claim 18, wherein the first interaxial distance is less than about 80 mm and the second interaxial distance is greater than about 50 mm.

* * * * *